Bartlit & Merryman.
Road Scraper.

N°76,698.    Patented Apr. 14, 1868.

Witnesses:
M. Cate
Peleg Werni

United States Patent Office.

WILLIAM C. BARTLIT, OF ALEDO, AND JOSEPH M. MERRYMAN, OF MOLINE, ILLINOIS.

*Letters Patent No. 76,698, dated April 14, 1868.*

IMPROVEMENT IN GRADING-MACHINES.

*The Schedule referred to in these Letters Patent and making part of the same.*

TO ALL WHOM IT MAY CONCERN:

Be it known that we, WILLIAM C. BARTLIT, of Aledo, in the county of Mercer, and State of Illinois, and JOSEPH M. MERRYMAN, of Moline, in the county of Rock Island, and State of Illinois, have invented a new and useful Improvement in Revolving Grading-Scrapers; and we do hereby declare that the following is a full, clear, and exact description of the same, reference being had to the accompanying drawings, and the letters and figures marked thereon, which form a part of this specification, and in which—

Figure 1:
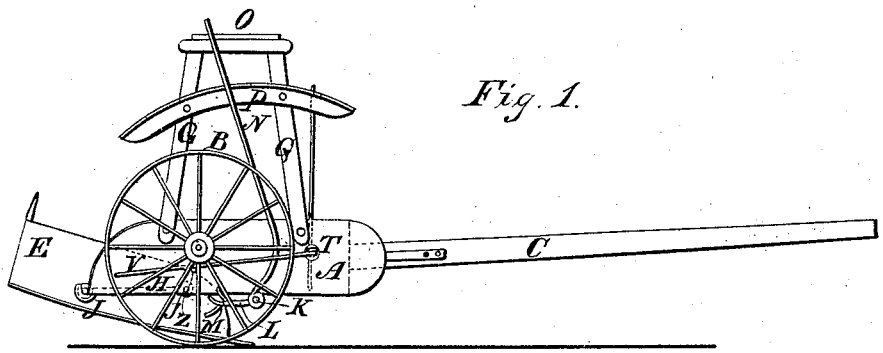

Figure 1 represents a side elevation of our improved scraper attached for use.

Figure 2:
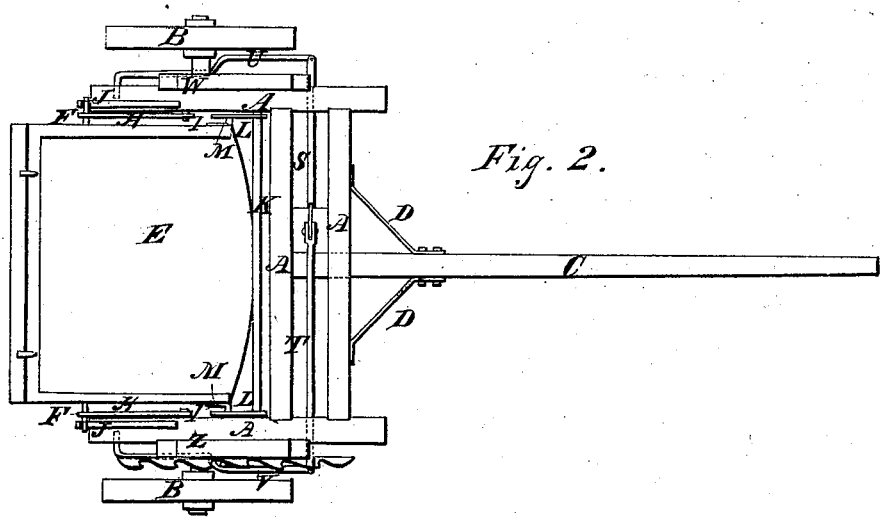

Figure 2, a top or plan view of the same.

Figure 3:
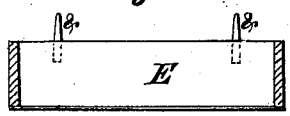
Figure 4:
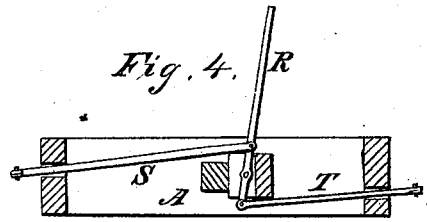

Figure 3, a sectional view of the scraper at the line $x$, showing more clearly the points which serve to revolve the same, as hereinafter fully described; and Figure 4 is a sectional view at the line $y$, showing more clearly the lever R and its attachments.

The nature of our invention consists in a novel method of attaching a grading-scraper to a frame, supported upon wheels, in such a manner that the scraper can be made to revolve at the will of the operator, for the purpose of dumping the load, and revolve into position for receiving another load, without raising the frame to which it is attached. It also consists in a novel device whereby the operator can set the scraper at any desired incline as the load is being received.

To enable those skilled in the art to manufacture and use our invention, we will proceed to describe the same with particularity.

We construct a substantial frame, A, of wood or other suitable material, which is supported on wheels B. In order to make a compact machine by bringing the scraper well forward, we do not extend our axle across the frame, but attach the spindles or axles, on which the wheels B revolve, firmly to the side pieces of the frame A. C is an ordinary pole, for guiding the machine, which is attached in any known way to the frame A, and braced by the braces D. E is the scraper, which is made in any known style, of convenient size, and F F are trunnions or spindles, firmly attached to its sides, on which it revolves.

There are arms H, through one end of which the trunnions F pass, the other end being pivoted or hinged to the frame A, at I'. The trunnions F turn in the ends of these arms H, as hereinafter described. There are supports J, which are made strong, and are firmly attached to the sides of the frame A, on which the trunnions rest when the scraper is being loaded. There is a shaft, K, which extends across the machine, near the front of the scraper, and to this shaft there are rigidly attached two arms, L, which are notched or forked at one end, as clearly shown in fig. 1. In these notches or forks rest the lugs M M, which are attached to the sides of the scraper E, near the front.

The lever N being rigidly attached to the shaft K, enables the operator, sitting on the seat O, to turn the shaft and vibrate the arms L L, which raises and lowers the front of the scraper, it turning on the trunnions F, and inclines it to any desired pitch. There is a rack, P, attached to the standards Q, of the seats, with notches, into which the lever N can be thrown, so as to hold the front of the scraper at any desired elevation.

To prevent the scraper from revolving before it is desired, there is a series of rods and levers, which are operated by simply moving the lever R. This lever R is attached to the frame A, in front of the driver, and has attached to it the rods S and T, one extending to the right, through one side of the frame A, and the other to the left, through the other side. There are two levers, U and V, one attached to the end of the rod S, the other to the end of the rod T, which extend back along the sides of the frame A, having pivoted fulcra at W and Z; their rear ends being bent so as to extend through the side pieces of the frame A, just above the arms H.

By throwing the lever R in one direction, the rods S and T are thrown out, and the bent ends of the levers U and V are thrown over the arms H, which locks the scraper in the position shown in figs. 1 and 2. When the scraper is thus locked, the operator, by throwing the lever N backwards or forwards, raises or lowers the front end of the scraper, as above described, and still it cannot revolve, but when the operator wishes to dump the load, he moves the lever R in the direction which throws the ends of the levers U and V from over the arms H, and at the same time throws back the lever N so as to allow the lugs M to fall out of the forked arms L.

The weight of the dirt in the scraper will cause it to revolve, but as it revolves, the arms H swing up, the trunnions F being raised from their supports J, and turning in the ends of said arms H, it does not raise the frame A. The scraper turns quite over, bottom side up, but as it strikes over, the pins or projections, &c., stick into the ground and cause the scraper to complete the entire revolution by revolving over into the position shown, the lugs falling into the notches in the arms L, and is locked, as above described, ready for another load.

Thus it will be seen that one man is able to do the work of several men by the use of a simple, cheap, and durable machine.

Having thus described the construction and operation of our invention, what we claim, and desire to secure by Letters Patent, is—

1. We claim the arms H, when so connected with the frame A and scraper E as to swing vertically, when the scraper revolves, substantially as herein set forth.

2. We claim the lock-levers U and V, in combination with the arms H, and scraper E, when arranged to lock the arms and keep the scraper from revolving, and at the same time admit of the front of the scraper being elevated or depressed to receive its load, substantially as herein described.

3. We claim the shaft K, and arms L, when arranged in connection with the front of the scraper E, with the lugs M, and lever N, or their equivalents, so that the operator can raise or lower the front of the scraper at pleasure, substantially as and for the purposes specified.

WILLIAM C. BARTLIT,
JOSEPH M. MERRYMAN.

Witnesses:
ADAM FRIES,
P. MAPES.